(12) United States Patent
Huang

(10) Patent No.: US 11,707,139 B2
(45) Date of Patent: Jul. 25, 2023

(54) SLEEPING PAD WITH FAST-INFLATION AND DEFLATION AIR NOZZLE

(71) Applicant: Huaao (Quzhou) Outdoor Products Co., Ltd., Quzhou (CN)

(72) Inventor: Xiuya Huang, Quzhou (CN)

(73) Assignee: Huaao (Quzhou) Outdoor Products Co., Ltd., Quzhou (CN)

( * ) Notice: Subject to any disclaimer, the term of this patent is extended or adjusted under 35 U.S.C. 154(b) by 17 days.

(21) Appl. No.: 17/552,632

(22) Filed: Dec. 16, 2021

(65) Prior Publication Data
US 2022/0104632 A1  Apr. 7, 2022

(30) Foreign Application Priority Data
Nov. 4, 2021  (CN) .......................... 202111299732.1

(51) Int. Cl.
*F16K 15/18* (2006.01)
*A47C 27/08* (2006.01)
*F16K 15/20* (2006.01)

(52) U.S. Cl.
CPC .......... *A47C 27/088* (2013.01); *A47C 27/084* (2013.01); *F16K 15/1825* (2021.08); *F16K 15/1845* (2021.08); *F16K 15/202* (2013.01); *F16K 15/205* (2013.01); *F16K 2200/203* (2021.08)

(58) Field of Classification Search
CPC .. F16K 15/1825; F16K 15/1845; F16K 15/20; F16K 15/202; F16K 15/205; F16K 2200/20; F16K 2200/203; A47C 27/081; A47C 27/088
See application file for complete search history.

(56) References Cited

U.S. PATENT DOCUMENTS

| | | | | |
|---|---|---|---|---|
| 9,955,793 | B2 * | 5/2018 | Helou | F16K 15/20 |
| 10,018,280 | B2 * | 7/2018 | Xia | F16K 15/202 |
| 10,288,181 | B2 * | 5/2019 | Arens | F16K 1/222 |
| 10,844,967 | B2 * | 11/2020 | Liu | F16K 15/202 |
| 11,079,030 | B2 * | 8/2021 | Pilotte | F16K 27/0209 |
| 2018/0328504 | A1 * | 11/2018 | Huang | F16K 15/202 |

FOREIGN PATENT DOCUMENTS

| | | |
|---|---|---|
| CN | 204878894 U | 12/2015 |
| CN | 206182821 U | 5/2017 |
| CN | 207830649 U | 9/2018 |

* cited by examiner

*Primary Examiner* — Kevin F Murphy

(57) ABSTRACT

A sleeping pad with a fast-inflation and deflation air nozzle includes a sleeping pad body with an air nozzle. The air nozzle includes a base, an air channel and a sealing cover. The sealing cover is detachably and sealedly inserted into the air channel. The air channel is detachably and sealedly inserted into the base. A deflating gasket is arranged at a top of a support in the air channel. A bottom of the support is provided with an inflating gasket. A switch between an inflation mode and a deflation mode is realized through switching positions of a first baffle plate and a second baffle plate of a switch baffle plate.

8 Claims, 6 Drawing Sheets

SLEEPING PAD WITH FAST-INFLATION AND DEFLATION AIR NOZZLE

CROSS-REFERENCE TO RELATED APPLICATIONS

This application claims the benefit of priority from Chinese Patent Application No. 202111299732.1, filed on Nov. 4, 2021. The content of the aforementioned application, including any intervening amendments thereto, is incorporated herein by reference in its entirety.

TECHNICAL FIELD

This application relates to air nozzles of sleeping pad, and more particularly to a sleeping pad with a fast-inflation and deflation air nozzle.

BACKGROUND

Sleeping pads, also named inflatable mattress or safety cushion, are widely used in outdoor activities. The sleeping pads are divided into the sleep pads without an air nozzle and the sleeping pads with an air nozzle for inflation and deflation. The air nozzle realizes the inflation and deflation of the sleep pad when the sleep pad is unfolded or stored. The existing air nozzle generally includes an air nozzle, an air hole and a gasket. Usually, one end of the air nozzle provided with the gasket is arranged inside the sleeping pad, and the other end of the air nozzle is an air inlet end; the gasket is fixed and attached to an end surface of the air nozzle provided with the air hole; and the gasket allows the air nozzle 01 to have the function of inflation only. Although the gasket is attached to the air hole, it is impossible to form a complete sealing in practical use, and an air leakage will occur.

The shortcomings of the existing air nozzle are described as follows. Conventional self-inflating sleeping pads are often provided with a sponge pad inside, such that when transforming from the rolled state to the unfolded state, the sleeping pad will naturally expand to a certain size, which is, however, not the most comfortable state, and it is additionally required to blow air into the sleeping pad through the air nozzle to make the sleeping pad reach the optimal state. In addition, when needed to be rolled for storage, the sleeping pad needs to be continuously rolled due to the existence of the sponge pad, and the air may return to the sleeping pad due to the pause during the rolling process, hindering the storage of the sleeping pad. In view of this, a sleeping pad with a fast-inflation and deflation air nozzle is provided.

SUMMARY

An objective of the present disclosure is to provide a sleeping pad with a fast-inflation and deflation air nozzle to solve the problems mentioned above.

The technical solutions of the present disclosure are described as follows.

A sleeping pad with a fast-inflation and deflation air nozzle, comprising:
  a sleeping pad body with an air nozzle;
  wherein a three-layer sponge pad is arranged in the sleeping pad body; a middle layer of the three-layer sponge pad is provided with a plurality of holes; the air nozzle comprises a base, an air channel and a sealing cover; the sealing cover is detachably and sealedly inserted into the air channel; and the air channel is detachably and sealedly inserted into the base;
  a support is integrally formed inside the air channel; a first gasket groove is arranged on a top of one side of the support; a second gasket groove is arranged on a bottom of the other side of the support; a bottom of the first gasket groove is provided with a first vent hole penetrating the support; a deflating gasket is fixedly provided in the first gasket groove; the deflating gasket is attached to the first vent hole of the first gasket groove; a top of the second gasket groove is provided with a second vent hole penetrating the support; an inflating gasket is fixedly provided in the second gasket groove; the inflating gasket is attached to the second vent hole of the second gasket groove; and the deflating gasket and the inflating gasket are both made of a silicone material; and
  a switch baffle plate is rotatably arranged on the support; the switch baffle plate comprises a first baffle plate and a second baffle plate; the first baffle plate is connected to the second baffle plate; the first baffle plate is arranged above the deflating gasket; the second baffle plate is arranged below the inflating gasket; the switch baffle plate is configured to be driven to rotate with respect to the support to achieve switch between an inflation mode and a deflation mode; when the switch baffle plate is in the inflation mode, the first baffle plate is directly above the deflating gasket and presses against the deflating gasket, and the second baffle plate is staggered from the inflating gasket and external air is blown onto the inflating gasket, such that the inflating gasket is deformed to expose the second vent hole, and the external air enters the sleeping pad body through the second vent hole; and when the switch baffle plate is in the deflation mode, the first baffle plate is staggered from the deflating gasket, and the second baffle plate is directly below the inflating gasket and abuts against the deflating gasket, such that air in the sleeping pad body is blown onto the deflating gasket, and the deflating gasket is deformed to expose the first vent hole, such that the air in the sleeping pad body is discharged to outside through the first vent hole.

In some embodiments, a side of the base, the air channel and the sealing cover is integrally provided with a connecting flexible strip; and the base, the air channel and the sealing cover are sequentially connected through the connecting flexible strip.

In some embodiments, an annular sealing groove is integrally formed on an inner side wall of a position where the sealing cover is inserted into the air channel; an outer side wall of the sealing cover is integrally provided with an annular protrusion matching the annular sealing groove; and the annular sealing groove is configured to accommodate the annular protrusion to achieve sealing between the sealing cover and the air channel.

In some embodiments, a cylindrical mounting hole is integrally formed at a center of the support; a cylindrical seat is integrally provided on a bottom of the first baffle plate; the cylindrical seat is sealedly and rotatably inserted into the cylindrical mounting hole; and the second baffle plate is connected to a bottom of the cylindrical seat of the first baffle plate.

In some embodiments, the first baffle plate and the second baffle plate are vertically aligned; a top of the second baffle plate is integrally provided with a plug column; the plug column is fixedly inserted into the bottom of the cylindrical seat; a top of the first baffle plate is integrally provided with a rotary knob; the rotary knob is configured to be driven to rotate with respect to the support to drive the first baffle plate, the cylindrical seat, the plug column and the second baffle plate to rotate synchronously, such that the switch baffle plate is capable of being switched between the inflation mode and the deflation mode.

In some embodiments, a top of the support is integrally provided with a positioning column; a side of the first baffle plate close to the cylindrical seat is provided with a first positioning groove and a second positioning groove; the first positioning groove and the second positioning groove are symmetrically arranged with respect to the cylindrical seat; the rotary knob is configured to be driven to rotate with respect to the support to drive the first baffle plate to rotate synchronously, so as to allow the first positioning groove or the second positioning groove to approach and accommodate the positioning column, such that the positioning column abuts against the first baffle plate to block rotation of the first baffle plate; when the positioning column is accommodated in the first positioning groove, the switch baffle plate is in the inflation mode; and when the positioning column is accommodated in the second positioning groove, the switch baffle plate is in the deflation mode.

In some embodiments, a first fixing hole is arranged in the first gasket groove; a first fixing column is integrally formed at a bottom of the deflating gasket; the first fixing column is sealedly and fixedly inserted into the first fixing hole, so as to fix the deflating gasket with respect the first gasket groove; a second fixing hole is arranged in the second gasket groove; a second fixing column is integrally formed at a top of the inflating gasket; the second fixing column is sealedly and fixedly inserted into the second fixing hole, so as to fix the inflating gasket with respect to the second gasket groove; and the first fixing column and the second fixing column are both made of a soft silicone material.

In some embodiments, the base and the support are both made of a thermoplastic polyurethane (TPU) material.

Compared to the prior art, the beneficial effects of the present disclosure are described as follows.

In the sleeping pad provided herein, the air nozzle consists of a base, an air channel and a sealing cover, and has a better sealing effect than the conventional air nozzle. Specifically, the air channel with the function of fast inflation and deflation is inserted into the base for sealing, and the sealing cover is sealedly inserted into the air channel to tighten the air channel by expanding, such that the air channel and the base are more tightly combined, so as to provide the air nozzle with a better sealing performance.

The switch baffle plate, the deflating gasket and the inflating gasket are provided herein. When in use, the rotary knob is driven to rotate with respect to the support, such that the switch baffle plate can be switched between the inflation mode and the deflation mode. When the first baffle plate is directly above the deflating gasket and presses against the deflating gasket, the second baffle plate is staggered from the inflating gasket, and the inflating gasket made of a silicone material may deform under the blowing of external air, so as to expose the second vent hole, such that the air nozzle can quickly inflate the sleeping pad through the second vent hole. When the second baffle plate is directly below the inflating gasket and abuts against the inflating gasket, the first baffle plate is staggered from the deflating gasket, and the inflating gasket made of the silicone material may deform under the blowing of the external air, so as to expose the first vent hole, such that the air nozzle can quickly deflate the sleeping pad through the first vent hole. Thus, the sleeping pad provided herein can be fast inflated and deflated through switching between the inflation mode and the deflation mode.

Objects, features and beneficial effects of the present disclosure will be described below with reference to the accompany drawings and embodiments.

Figure 1:
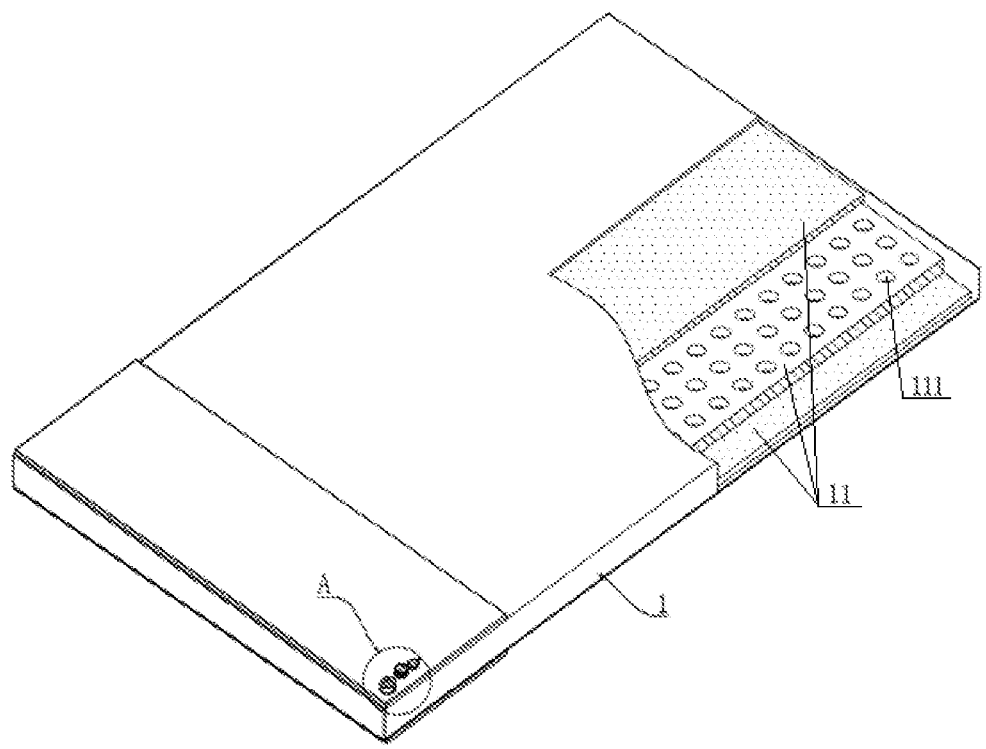
FIG. 1 schematically depicts a structure of a sleeping pad according to an embodiment of the present disclosure.

In the drawings, 1, sleeping pad body; 11, sponge pad; 111, hole; 2, base; 3, air channel; 4, sealing cover; 41, annular protrusion; 5, connecting flexible strip; 6, support; 71, first gasket groove; 72, second gasket groove; 81, first vent hole; 82, second vent hole; 9, positioning column; 10, mounting hole; 110, deflating gasket; 12, plug column; 13, switch baffle plate; 14, rotary knob; 151, first positioning groove; 152, second positioning groove; 16, inflating gasket; 171, first fixing column; 172, second fixing column; 18, first baffle plate; 19, second baffle plate; 20, flange; 21. cylindrical seat; 22, sealing groove; 231, first fixing hole; 232, second fixing hole; 24. air nozzle; and

01, air nozzle; 02, air hole; and 03, gasket.

DETAILED DESCRIPTION OF EMBODIMENTS

The same or similar components are indicated with the same reference numeral in different drawings. As used herein, terms such as "first", "second", "third", "upper", "lower", "front", "rear", "inner", "outer", "end", "part", "section", "width", "thickness" and "area" are merely for facilitating the understanding of the structure shown in the drawings and description of this disclosure, and are not intended to limit the present disclosure.

The technical solutions of the present disclosure will be clearly and completely described below with reference to the embodiments and the accompanying drawings. Obviously, the embodiments provided herein are merely some embodiments of the present disclosure, and other embodiments made by those skilled in the art based on the embodiments provided herein without paying creative effort should fall within the scope of the present disclosure.

The embodiments of the present disclosure are described below with reference to FIGS. 1-9.

Figure 2:
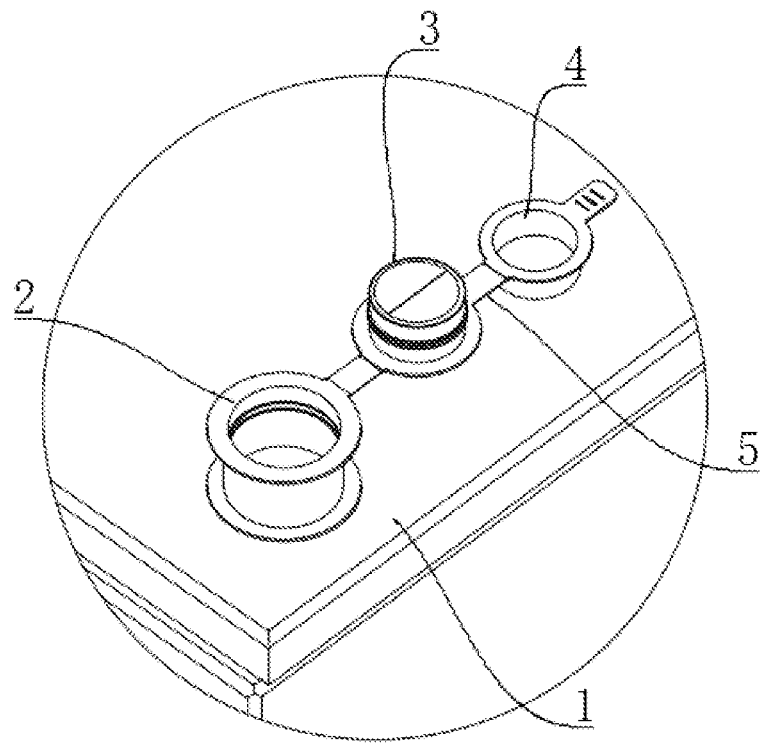
FIG. 2 is an enlarged view of part A in FIG. 1.
Figure 3:
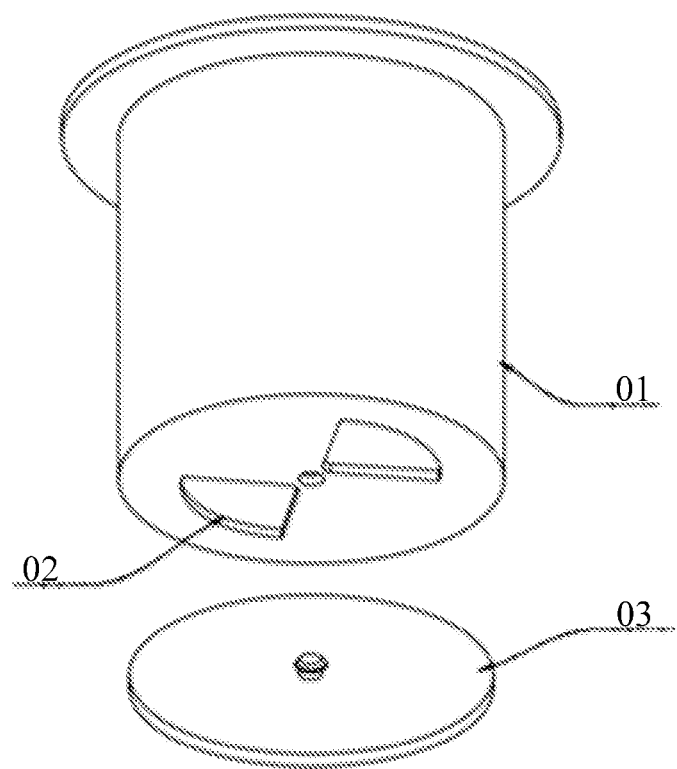
FIG. 3 schematically depicts a structure of an ordinary air nozzle in the prior art.
Figure 8:
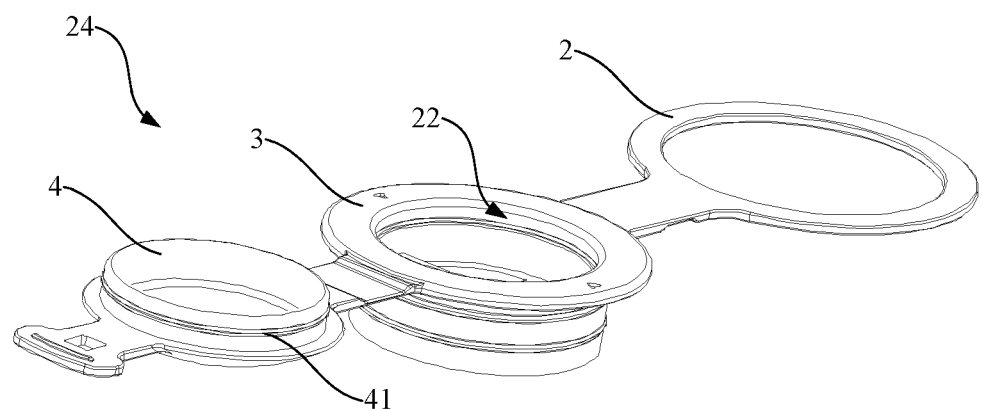
FIG. 8 is a schematic diagram depicting a structure of a three-section air nozzle according to an embodiment of the present disclosure.

As shown in FIGS. 1-2 and 8, a sleeping pad with a fast-inflation and deflation air nozzle includes a sleeping pad body 1 with an air nozzle 24. The air nozzle 24 includes a base 2, an air channel 3 and a sealing cover 4. The sealing cover 4 is detachably and sealedly inserted into the air channel 3, and the air channel 3 is detachably and sealedly inserted into the base 2.

Figure 4:
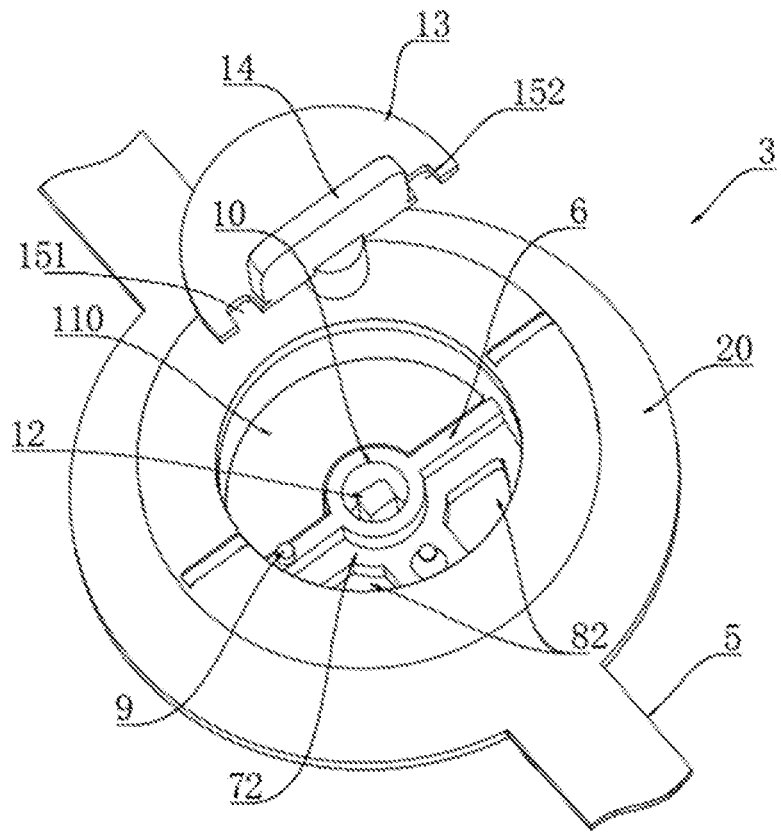
FIG. 4 schematically depicts a split structure of an air channel according to an embodiment of the present disclosure.
Figure 5:
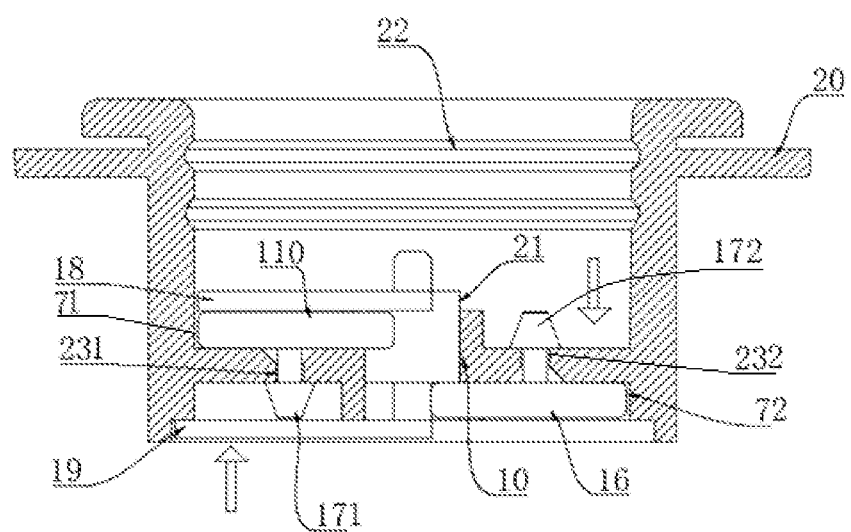
FIG. 5 is cross-sectional view of the air channel according to an embodiment of the present disclosure.
Figure 7:
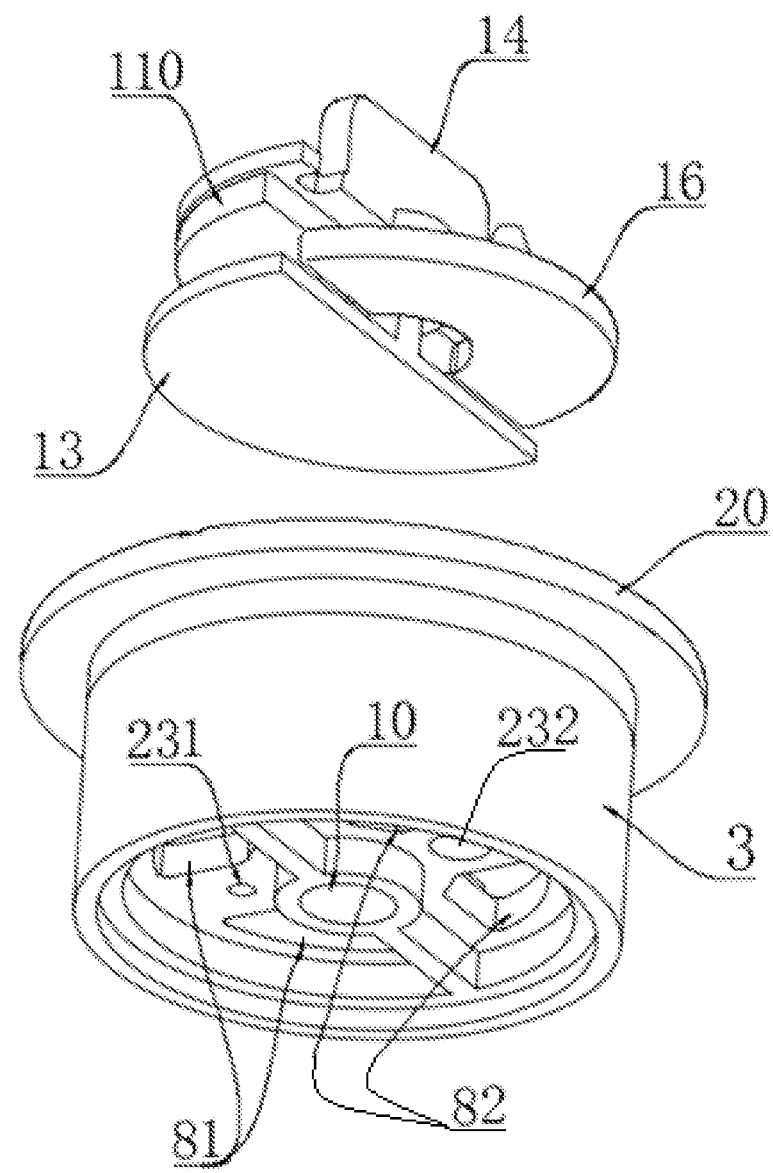
FIG. 7 schematically depicts the structure of the switch baffle plate and the air channel according to an embodiment of the present disclosure.

As shown in FIGS. 4-5 and 7, a support 6 is integrally formed inside the air channel 3. A first gasket groove 71 is integrally formed on a top of one side of the support 6. A second gasket groove 72 is integrally formed on a bottom of the other side of the support 6. A bottom of the first gasket groove 71 is provided with a first vent hole 81 penetrating the support 6. A deflating gasket 110 is fixedly provided in the first gasket groove 71. The deflating gasket 110 is attached to the first vent hole 81 of the first gasket groove 71. A top of the second gasket groove 72 is provided with a second vent hole 82 penetrating the support 6. An inflating gasket 16 is fixedly provided in the second gasket groove 72. The inflating gasket 16 is attached to the second vent hole 82 of the second gasket groove 72. The deflating gasket 110 and the inflating gasket 16 are both made of a silicone material.

As shown in FIG. 1, the sleeping pad body 1 is a self-inflating sleeping pad with a three-layer sponge pad 11 therein. A middle layer of the three-layer sponge pad 11 is provided with a plurality of holes 111 to reduce an overall weight of the sleeping pad and facilitate storage. Since the sleeping pad body 1 is provided with the three-layer sponge pad 11, the sleeping pad body 1 is capable of inhaling due to an automatic expansion of sponge in a rolled storage state, such that when the air channel 3 is adjusted to an inhaling state, an automatic inflation is carried out. When the sleeping pad body 1 needs to be rolled up for storage, a deflation is required and the air channel 3 is adjusted to a deflation state. When a user rolls up the sleeping pad for storage, the deflating gasket 110 in the air channel 3 prevents the sleep pad from a backflow, such that the user can smoothly roll up and store the sleeping pad.

Figure 6:
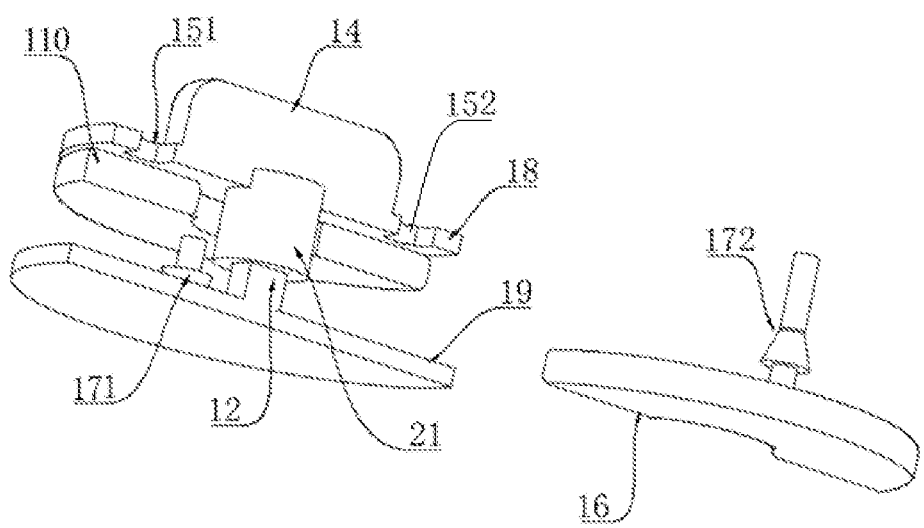
FIG. 6 schematically depicts a structure of a switch baffle plate, an inflating plate and a deflating plate according to an embodiment of the present disclosure.

As shown in FIGS. 4-6, a switch baffle plate 13 is rotatably arranged on the support 6. The switch baffle plate 13 includes a first baffle plate 18 and a second baffle plate 19. The first baffle plate 18 is connected to the second baffle plate 19. The first baffle plate 18 is arranged above the deflating gasket 110. The second baffle plate 19 is arranged below the inflating gasket 16. The switch baffle plate 13 configured to be driven to rotate with respect to the support 6 to achieve switch between an inflation mode and a deflation mode. When the switch baffle plate 13 is in the inflation mode, the first baffle plate 18 is arranged directly above the deflating gasket 110 and presses against the deflating gasket 110, and the second baffle plate 19 is staggered from the inflating gasket 16 and external air is blown onto the inflating gasket 16, such that the inflating gasket 16 is deformed and the second vent hole 82 is exposed, and the external air enters the sleeping pad body 1 through the second vent hole 82. When the switch baffle plate 13 is in the deflation mode, the first baffle plate 18 is staggered from the deflating gasket 110, and the second baffle plate 19 is arranged directly below the inflating gasket 16 and abuts against the deflating gasket 110. Air in the sleeping pad body 1 is blown onto the deflating gasket 110, such that the deflating gasket 110 is deformed and the first vent hole 81 is exposed, and the air in the sleeping pad body 1 is discharged to the outside through the first vent hole 81.

Figure 9:
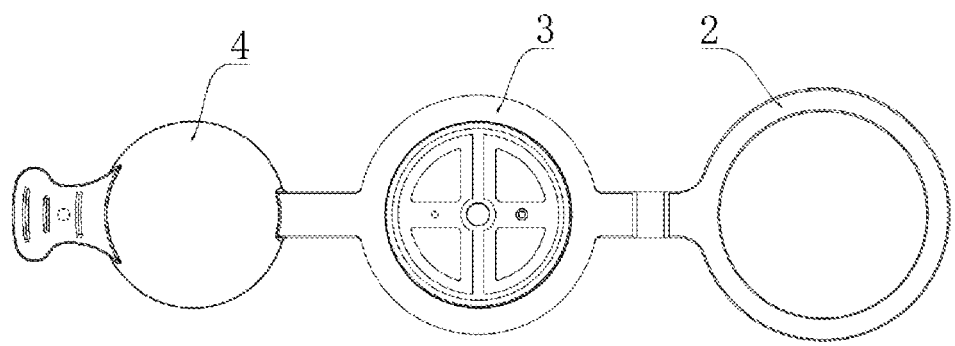
FIG. 9 is another schematic diagram depicting the structure of the three-section air nozzle according to an embodiment of the present disclosure.

As shown in FIGS. 2 and 8-9, sides of the base 2, the air channel 3 and the sealing cover 4 are all integrally provided with a connecting flexible strip 5. The base 2, the air channel 3 and the sealing cover 4 are sequentially connected through the connecting flexible strip 5. As shown in FIG. 5, the connecting flexible strip 5, the base 2, the air channel 3 and the sealing cover 4 are integrally formed. A direction of the air channel 3 is generally opposite to that of the base 2 and the sealing cover 4, such that in the practical operation, the air channel 3, the base 2 and the sealing cover 4 can be turned over to achieve the sealed plugging through the two connecting flexible strips shown in FIG. 2.

In this embodiment, an end of the closing cover 4 away from the air channel 3 is integrally provided with the connecting flexible strip 5. Specifically, when the closing cover 4 needs to be pulled out from the air channel 3, through holding the connecting flexible strip 5 of the closing cover 4 by hand, a force is easy to be applied on the sealing cover 4, so as to facilitate the pulling out of the sealing cover 4 from the air channel 3.

As shown in FIGS. 4-5 and 7, an outer part of the air channel 3 is integrally provided with a flanging 20. The connecting flexible strip 5 is connected to the flanging 20 of the air channel 3.

As shown in FIGS. 5 and 8, an annular sealing groove 22 is integrally formed on an inner side wall of a position where the sealing cover is inserted into the air channel 3. An outer side wall of the sealing cover 4 is integrally provided with an annular protrusion 41 matching the annular sealing groove 22. In actual use, the annular sealing groove 22 is configured to accommodate the annular protrusion 41 to achieve the sealing between the sealing cover 4 and the air channel 3. Specifically, when the sealing cover 4 is inserted into the air channel 3, the annular protrusion 41 is accommodated in the annular sealing groove 22, and the match of the annular protrusion 41 and the annular sealing groove 22 provides the air channel 3 and the sealing cover with a better sealing effect.

As shown in FIGS. 4 and 5, a cylindrical mounting hole 10 is integrally formed at a center of the support 6. A cylindrical seat 21 is integrally provided on a bottom of the first baffle plate 18 of the switch baffle plate 13. The cylindrical seat 21 is sealedly and rotatably inserted into the cylindrical mounting hole 10. The second baffle plate 19 is connected to a bottom of the cylindrical seat 21 of the first baffle plate 18.

As shown in FIGS. 5 and 6, the first baffle plate 18 and the second baffle plate 19 are vertically aligned. A top of the second baffle plate 19 of the switch baffle plate 13 is integrally provided with a plug column 12. The plug column 12 is fixedly inserted into the bottom of the cylindrical seat 21, A top of the first baffle plate 18 is integrally provided with a rotary knob 14. The rotary knob 14 is configured to be driven to rotate with respect to the support 6 to drive the first baffle plate 18, the cylindrical seat 21, the plug column 12 and the second baffle plate 19 to rotate synchronously, such that the switch baffle plate 13 can be switched between the inflation mode and the deflation mode. The rotary knob 14 allows the user to switch the switch baffle plate 13 by hand between the inflation mode and the deflation mode more conveniently.

As shown in FIG. 4, a top of the support 6 is integrally provided with a positioning column 9. A side of the first baffle plate 18 close to the cylindrical seat 21 is provided with a first positioning groove 151 and a second positioning groove 152. The first positioning groove 151 and the second positioning groove 152 are symmetrically arranged with respect to the cylindrical seat 21. The rotary knob 14 is configured to be driven to rotate with respect to the support 6 to drive the first baffle plate 18 to rotate synchronously, so as to allow the first positioning groove 151 or the second positioning groove 152 to approach and accommodate the positioning column 9, such that the positioning column 9 abuts against the first baffle plate 18 to block the rotation of the first baffle plate 18. When the positioning column 9 is accommodated in the first positioning groove 151, the switch baffle plate 13 is in the inflation mode. When the positioning column 9 is accommodated in the second positioning groove 152, the switch baffle plate 13 is in the deflation mode. Specifically, when inflation is required, the rotary knob 14 is driven to rotate with respect to the support 6 along a first direction to drive the first baffle plate 18 to rotate synchronously, so as to allow the first positioning groove 151 to approach and accommodate the positioning column 9, such that the positioning column 9 abuts against the first positioning groove 151 to block the rotation of the first baffle plate 18 along the first direction, and the switch baffle plate 13 enters the inflation mode. When deflation is required, the rotary knob 14 is driven to rotate with respect to the support 6 along a second direction opposite to the first direction to drive the first baffle plate 18 to rotate synchronously, so as to allow the second positioning groove 152 to approach and accommodate the positioning column 9, such that the positioning column 9 abuts against the second positioning groove 152 to block the rotation of the first baffle plate 18 along the second direction, and the switch baffle plate 13 enters the deflation mode.

In practice, the first baffle plate 18 and the second baffle plate 19 are generally in a semicircular-like shape. As shown in FIG. 4, a rotation angle of the switch baffle plate 13 is limited within 180° due do the arrangement of the first positioning groove 151, the second positioning groove 152 and the positioning column 9, such that the user can accurately switch the switch baffle plate 13 between the inflation mode and the deflation mode.

As shown in FIG. 5, a first fixing hole 231 is arranged in the first gasket groove 71 of the support 6, and a first fixing column 171 is integrally formed at a bottom of the deflating gasket 110. The first fixing column 171 is sealedly and fixedly inserted into the first fixing hole 231, so as to fix the deflating gasket 110 with respect the first gasket groove 71. A second fixing hole 232 is arranged in the second gasket groove 72, and a second fixing column 172 is integrally formed on a top of the inflating gasket 16. The second fixing column 172 is sealedly and fixedly inserted into the second fixing hole 232, so as to fix the inflating gasket 16 with respect to the second gasket groove 72. The first fixing column 171 and the second fixing column 172 are made of a soft silicone material. As shown in FIGS. 5-6, the deflating gasket 110 is assembled through the match of the first fixing column 171 and the first fixing hole 231, and the inflating gasket 16 is assembled through the match of the second fixing column 172 and the second fixing hole 232. In practice, the first fixing column 171 and the second fixing column 172 are shaped as shown in FIGS. 5-6. The first fixing column 171 and the second fixing column 172 are respectively inserted into the first fixing hole 231 and the second fixing hole 232 for locking, preventing the deflating gasket 110 from falling out of the first gasket groove 71 and preventing the inflating gasket 16 from falling out of the second gasket groove 72.

In this embodiment, when the inflation is required, the switch baffle plate 13 is driven to rotate with respect to the support 6, so as to allow the first baffle plate 18 to be directly above the deflating gasket 110 and press the deflating gasket 110, such that the deflating gasket 110 completely covers the first vent hole 81. At this time, the second baffle plate 19 is staggered from the inflating gasket 16, and the external air is blown onto the inflating gasket 16, such that the second fixing column 172 is deformed and elongated. Consequently, the inflating gasket 16 cannot completely cover the second vent hole 82, such that the second vent hole 82 are exposed, and the external air can enter the sleeping pad body 1 through the second vent hole 82 to inflate the sleeping pad body 1. When the deflation is required, the switch baffle plate 13 is driven to rotate the other direction with respect to the support 6, such that the second baffle plate 19 is directly under the inflating gasket 16 and abuts against the deflating gasket 110, and the inflating gasket 16 completely covers the first vent hole 81. The first baffle plate 18 is staggered from the deflating gasket 110, and the air in the sleeping pad body 1 is blown onto the deflating gasket 110, such that the first fixing column 171 is deformed and elongated, and the deflating gasket 110 cannot completely cover the first vent hole 81. Thus, the first vent hole 81 is exposed, and the air in the sleeping pad body 1 can be discharged to the outside through the first vent hole 81, so as to deflate the sleeping pad body 1.

Both the base 2 and the support 6 are made of a thermoplastic polyurethane (TPU) material. In practice, the base 2 and the support 6 are produced and processed by three-dimensional (3D) printing.

In practice, the air nozzle 24, which includes the base 2, the air channel 3 and the sealing cover 4, has a better sealing effect than the conventional air nozzle. Specifically, the air channel 3 with the function of fast inflation and deflation is inserted into the base 2 for sealing, and the sealing cover 4 is sealedly inserted into the air channel 3 to expandingly tighten the air channel 3, such that the air channel 3 and the base 2 are tightly combined, so as to provide the air nozzle 24 with a better sealing performance.

The switch baffle plate, the deflating gasket and the inflating gasket are provided herein. When in use, the rotary knob 14 is driven to rotate with respect to the support 6 along the first direction to drive the first baffle plate 18 and the second baffle plate 19 to rotate synchronously, so as to allow the first positioning groove 151 or the second positioning groove 152 to approach and accommodate the positioning column 9, such that the switch baffle plate 13 can be switched between the inflation mode and the deflation mode. When the positioning column 9 is accommodated in the first positioning groove 151, the first baffle plate 18 is directly above the deflating gasket 110 and presses against the deflating gasket 110, such that the deflating gasket 110 completely covers the first vent hole 81. At this time, the second baffle plate 19 is staggered from the inflating gasket 16, and the external air is blown onto the inflating gasket 16, such that the second fixing column 172 is deformed and elongated, and the second vent hole 82 is exposed from the inflating gasket 16, so as to allow the external air to enter the sleeping pad body 1 through the second vent hole 82, such that the air nozzle 24 can quickly inflate the sleeping pad body 1. When the positioning column 9 is accommodated in the second positioning groove 152, the second baffle plate 19 is directly under the inflating gasket 16 and abuts against the inflating gasket 16, and the inflating gasket 16 completely covers the first vent hole 81. At this time, the first baffle plate 18 is staggered from the deflating gasket 110, and the air in the sleeping pad body 1 is blown onto the deflating gasket 110, and the first vent hole 81 is exposed from the deflating gasket 110, so as to allow the air in the sleeping pad body 1 to be discharged to the outside through the first vent hole 81, such that the air nozzle 24 can quickly deflate the sleeping pad body 1. Thus, the sleep pad with the air nozzle 24 provided herein can realize fast inflation and deflation through switching between the inflation mode and the deflation mode.

In summary, the switch baffle plate 13 is detachably and sealedly inserted into the air channel 3, and the air channel 3 is inserted into the base 2. The first vent hole 81 and the second vent hole 82 are arranged in the air channel 3, and are configured for deflation and inflation, respectively. The first vent hole 81 is provided with the deflating gasket 110 for sealing, and the second vent hole 82 is provided with the inflatable gasket 16 for sealing. The air channel 3 is provided with the first baffle plate 18 and the second baffle plate 19 that can rotate at the same time, and the first baffle plate 18 is arranged above the second baffle plate 19, such that the first baffle plate 18 may press the deflating gasket 110 and the second baffle plate 19 may abut against the inflating gasket 16, so as to prevent the backflow of air. The top of the first baffle plate 18 is provided with the rotary knob 14. The switch between the inflation mode and the deflation mode can be realized through turning the rotary knob right or left. The fast inflation and deflation of the sleeping pad with the air nozzle 24 is achieved through such switch between the inflation mode and the deflation mode.

Although the embodiments of the present disclosure have been described in detail above, it should be understood that variations, modifications and replacements made by those skilled in the art without departing from the spirit of this disclosure should fall within the scope of the present disclosure defined by the appended claims.

What is claimed is:

1. A sleeping pad, comprising:
   a sleeping pad body with an air nozzle;
   wherein a three-layer sponge pad is arranged in the sleeping pad body; a middle layer of the three-layer sponge pad is provided with a plurality of holes; the air nozzle comprises a base, an air channel and a sealing cover; the sealing cover is detachably and sealedly inserted into the air channel; and the air channel is detachably and sealedly inserted into the base;
   a support is integrally formed inside the air channel; a first gasket groove is arranged on a top of one side of the support; a second gasket groove is arranged on a bottom of the other side of the support; a bottom of the first gasket groove is provided with a first vent hole penetrating the support; a deflating gasket is fixedly provided in the first gasket groove; the deflating gasket is attached to the first vent hole of the first gasket groove; a top of the second gasket groove is provided with a second vent hole penetrating the support; an inflating gasket is fixedly provided in the second gasket groove; the inflating gasket is attached to the second vent hole of the second gasket groove; and the deflating gasket and the inflating gasket are both made of a silicone material; and
   a switch baffle plate is rotatably arranged on the support; the switch baffle plate comprises a first baffle plate and a second baffle plate; the first baffle plate is connected to the second baffle plate; the first baffle plate is arranged above the deflating gasket; the second baffle plate is arranged below the inflating gasket; the switch baffle plate is configured to be driven to rotate with respect to the support to achieve switch between an inflation mode and a deflation mode; when the switch baffle plate is in the inflation mode, the first baffle plate is directly above the deflating gasket and presses against the deflating gasket, and the second baffle plate is staggered from the inflating gasket and external air is blown onto the inflating gasket, such that the inflating gasket is deformed to expose the second vent hole, and the external air enters the sleeping pad body through the second vent hole; and when the switch baffle plate is in the deflation mode, the first baffle plate is staggered from the deflating gasket, and the second baffle plate is directly below the inflating gasket and abuts against the deflating gasket, such that air in the sleeping pad body is blown onto the deflating gasket, and the deflating gasket is deformed to expose the first vent hole, such that the air in the sleeping pad body is discharged to outside through the first vent hole.

2. The sleeping pad of claim 1, wherein a side of the base, the air channel and the sealing cover is integrally provided with a connecting flexible strip; and the base, the air channel and the sealing cover are sequentially connected through the connecting flexible strip.

3. The sleeping pad of claim 1, wherein an annular sealing groove is integrally formed on an inner side wall of a position where the sealing cover is inserted into the air channel; an outer side wall of the sealing cover is integrally provided with an annular protrusion matching the annular sealing groove; and the annular sealing groove is configured to accommodate the annular protrusion to achieve sealing between the sealing cover and the air channel.

4. The sleeping pad of claim 1, wherein a cylindrical mounting hole is integrally formed at a center of the support; a cylindrical seat is integrally provided on a bottom of the first baffle plate; the cylindrical seat is sealedly and rotatably inserted into the cylindrical mounting hole; and the second baffle plate is connected to a bottom of the cylindrical seat of the first baffle plate.

5. The sleeping pad of claim 4, wherein the first baffle plate and the second baffle plate are vertically aligned; a top of the second baffle plate is integrally provided with a plug column; the plug column is fixedly inserted into the bottom of the cylindrical seat; a top of the first baffle plate is integrally provided with a rotary knob; the rotary knob is configured to be driven to rotate with respect to the support to drive the first baffle plate, the cylindrical seat, the plug column and the second baffle plate to rotate synchronously, such that the switch baffle plate is capable of being switched between the inflation mode and the deflation mode.

6. The sleeping pad of claim 5, wherein a top of the support is integrally provided with a positioning column; a side of the first baffle plate close to the cylindrical seat is provided with a first positioning groove and a second positioning groove; the first positioning groove and the second positioning groove are symmetrically arranged with respect to the cylindrical seat; the rotary knob is configured to be driven to rotate with respect to the support to drive the first baffle plate to rotate synchronously, so as to allow the first positioning groove or the second positioning groove to approach and accommodate the positioning column, such that the positioning column abuts against the first baffle plate to block rotation of the first baffle plate; when the positioning column is accommodated in the first positioning groove, the switch baffle plate is in the inflation mode; and when the positioning column is accommodated in the second positioning groove, the switch baffle plate is in the deflation mode.

7. The sleeping pad of claim 1, wherein a first fixing hole is arranged in the first gasket groove; a first fixing column is integrally formed at a bottom of the deflating gasket; the first fixing column is sealedly and fixedly inserted into the first fixing hole, so as to fix the deflating gasket with respect the first gasket groove; a second fixing hole is arranged in the second gasket groove; a second fixing column is integrally formed at a top of the inflating gasket; the second fixing column is sealedly and fixedly inserted into the second fixing hole, so as to fix the inflating gasket with respect to the second gasket groove; and the first fixing column and the second fixing column are both made of a soft silicone material.

8. The sleeping pad of claim 1, wherein the base and the support are both made of a thermoplastic polyurethane (TPU) material.

\* \* \* \* \*